(12) United States Patent
Kurihara et al.

(10) Patent No.: US 12,264,744 B2
(45) Date of Patent: Apr. 1, 2025

(54) VALVE

(71) Applicant: EAGLE INDUSTRY CO., LTD., Tokyo (JP)

(72) Inventors: Daichi Kurihara, Tokyo (JP); Akihiro Hashiguchi, Tokyo (JP); Kohei Fukudome, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/027,599

(22) PCT Filed: Sep. 24, 2021

(86) PCT No.: PCT/JP2021/034990
§ 371 (c)(1),
(2) Date: Mar. 21, 2023

(87) PCT Pub. No.: WO2022/065410
PCT Pub. Date: Mar. 31, 2022

(65) Prior Publication Data
US 2023/0400104 A1   Dec. 14, 2023

(30) Foreign Application Priority Data
Sep. 28, 2020   (JP) ................................. 2020-162683

(51) Int. Cl.
*F16K 1/42*   (2006.01)
*F16K 1/36*   (2006.01)
*F16K 17/04*   (2006.01)

(52) U.S. Cl.
CPC ................. *F16K 1/42* (2013.01); *F16K 1/36* (2013.01); *F16K 17/04* (2013.01)

(58) Field of Classification Search
CPC ... F16K 41/10; F16K 1/42; F16K 1/36; F16K 17/04; F16K 27/029; F04B 2027/1822; F04B 2027/184
See application file for complete search history.

(56) References Cited

U.S. PATENT DOCUMENTS

| | | | |
|---|---|---|---|
| 813,555 A | 2/1906 | Hayden | ..................... F16K 1/34 |
| 821,758 A | 5/1906 | Smith | ....................... F16K 1/46 |

(Continued)

FOREIGN PATENT DOCUMENTS

| | | | |
|---|---|---|---|
| CN | 107339442 | 11/2017 | ............... F16K 1/02 |
| CN | 209146387 | 7/2019 | ............. F16K 31/42 |

(Continued)

OTHER PUBLICATIONS

Machine Translation of JP2000304152A retrieved from espacenet.com Jun. 2024 (Year: 2024).*

(Continued)

*Primary Examiner* — Jessica Cahill
(74) *Attorney, Agent, or Firm* — HAYES SOLOWAY P.C.

(57) ABSTRACT

A valve includes: a housing having a primary pressure space and a secondary pressure space; a valve seat disposed between the primary pressure space and the secondary pressure space; a valve body that is driven in an axial direction by a driving source to be seated on or separate from the valve seat; and a communication passage that provides communication between a back space adjacent to one of the primary pressure space and the secondary pressure space and remaining one of the primary pressure space and the secondary pressure space. A partition member is disposed between the valve housing and the valve body, and the back space and the one of the primary pressure space and the secondary pressure space are partioned off from each other in a sealed state by the partition member.

11 Claims, 4 Drawing Sheets

(56) References Cited

U.S. PATENT DOCUMENTS

| | | | | |
|---|---|---|---|---|
| 877,865 | A | 1/1908 | Ricksecker | F16K 1/34 |
| 1,449,876 | A | 3/1923 | Erastus | F01L 3/20 |
| 1,614,002 | A | 1/1927 | Horton | A62C 35/605 |
| 1,758,471 | A | 5/1930 | Julius | F16K 1/46 |
| 1,800,127 | A | 4/1931 | Wilson | F16K 1/34 |
| 1,847,385 | A | 3/1932 | Franklin | F16K 1/34 |
| 2,196,798 | A | 4/1940 | Otto | F16K 1/36 |
| 2,267,515 | A | 12/1941 | Wilcox | F16K 31/0627 |
| 2,331,503 | A * | 10/1943 | Ray | F16K 41/10 251/80 |
| 2,797,061 | A | 6/1957 | Buchanan | F16K 31/06 |
| 2,887,293 | A | 5/1959 | Fred | F16K 31/60 |
| 2,893,685 | A | 7/1959 | Camp | F16K 1/36 |
| 2,898,082 | A | 8/1959 | Von Almen | F04B 53/1027 |
| 3,049,332 | A | 8/1962 | Webster | F16K 1/02 |
| 3,054,422 | A | 9/1962 | Napolitano | F16K 1/385 |
| 3,070,120 | A | 12/1962 | Wendt | F16K 1/46 |
| 3,185,438 | A | 5/1965 | Smirra | F16K 1/34 |
| 3,204,925 | A | 9/1965 | Enrico | F16K 1/50 |
| 3,230,973 | A | 1/1966 | Rudolf | F16K 1/46 |
| 3,278,156 | A | 10/1966 | Callahan | F16K 41/10 |
| 3,360,304 | A | 12/1967 | Adams | B61K 7/12 |
| 3,394,732 | A | 7/1968 | Constantine | F16K 1/36 |
| 3,426,741 | A | 2/1969 | Haagen | F01L 3/02 |
| 3,483,888 | A | 12/1969 | Hugo | F16K 15/046 |
| 3,623,699 | A | 11/1971 | Matousek | F16K 1/46 |
| 3,627,257 | A * | 12/1971 | Stampfli | F16K 31/0693 251/282 |
| 3,679,169 | A | 7/1972 | Bedo | F16K 41/02 |
| 3,854,495 | A | 12/1974 | Cowley | G05D 16/0663 |
| 4,085,921 | A | 4/1978 | Ueda et al. | F16K 31/06 |
| 4,149,699 | A | 4/1979 | Speckmann | F16K 41/00 |
| 4,318,532 | A | 3/1982 | Winkler | F16K 1/34 |
| 4,345,739 | A | 8/1982 | Wheatley | F16K 1/2263 |
| 4,364,615 | A | 12/1982 | Euler | F16C 27/04 |
| 4,417,601 | A | 11/1983 | Bennett | A62C 31/12 |
| 4,448,038 | A | 5/1984 | Barbier | F25B 41/34 |
| 4,474,356 | A | 10/1984 | Baumann | F16K 1/12 |
| 4,579,145 | A | 4/1986 | Leiber | F16H 61/0251 |
| 4,615,358 | A | 10/1986 | Hammond | F15B 13/0402 |
| 4,617,889 | A | 10/1986 | Nishimiya | F02D 31/00 |
| 4,632,358 | A | 12/1986 | Orth | F25B 41/347 |
| 4,778,150 | A | 10/1988 | Pratt | F16K 41/043 |
| 4,825,909 | A | 5/1989 | Martin | F15B 13/02 |
| 4,848,729 | A | 7/1989 | Danzy | F16K 1/46 |
| 4,895,192 | A | 1/1990 | Mortenson | F01M 11/04 |
| 4,915,355 | A | 4/1990 | Fort | F16K 1/46 |
| 4,917,150 | A | 4/1990 | Koch | F16K 31/0606 |
| 4,922,957 | A | 5/1990 | Johnson | F16K 1/46 |
| 4,923,173 | A | 5/1990 | Szymaszek | F16K 1/36 |
| 4,979,542 | A | 12/1990 | Mesenich | F02M 47/027 |
| 4,998,559 | A | 3/1991 | McAuliffe | F16H 61/0251 |
| 5,011,116 | A | 4/1991 | Alberts | F16K 47/00 |
| 5,060,695 | A | 10/1991 | McCabe | G05D 16/2024 |
| 5,217,047 | A | 6/1993 | McCabe | F16H 16/0251 |
| 5,232,195 | A | 8/1993 | Torrielli | H01F 7/1607 |
| 5,246,205 | A | 9/1993 | Gillingham | F01N 3/0212 |
| 5,263,694 | A | 11/1993 | Smith | B60G 15/068 |
| 5,364,066 | A | 11/1994 | Dorste | F25B 41/35 |
| 5,409,036 | A | 4/1995 | Ahmadian | H01F 7/14 |
| 5,439,027 | A | 8/1995 | Layton | F16K 1/385 |
| 5,702,235 | A | 12/1997 | Hirota | F04B 27/1804 |
| 5,778,932 | A | 7/1998 | Alexander | G05D 16/2024 |
| 6,010,312 | A | 1/2000 | Suitou | F04B 27/1804 |
| 6,019,118 | A | 2/2000 | Voggenreiter et al. | F16K 51/02 |
| 6,155,391 | A | 12/2000 | Kashiwagi et al. | F16F 9/348 |
| 6,161,585 | A | 12/2000 | Kolchinsky | F05D 16/2024 |
| 6,257,836 | B1 | 7/2001 | Ota et al. | 417/222.02 |
| 6,315,266 | B1 | 11/2001 | Hirota | F16K 31/406 |
| 6,321,995 | B1 | 11/2001 | Badovick | F25B 41/335 |
| 6,361,283 | B1 | 3/2002 | Ota | F04B 27/1084 |
| 6,443,420 | B1 | 9/2002 | Hettinger | F16K 31/02 |
| 6,481,976 | B2 | 11/2002 | Kimura | F04B 27/1804 |
| 6,626,000 | B1 | 9/2003 | Meyer | F25B 41/345 |
| 6,776,182 | B2 | 8/2004 | Ishitoya | F16K 25/00 |
| 6,811,140 | B1 | 11/2004 | Maini | F16K 1/46 |
| 6,840,504 | B2 | 1/2005 | Hagiwara | F16K 1/36 |
| 6,959,718 | B2 | 11/2005 | Kayahara | F16K 31/0655 |
| 7,007,917 | B2 | 3/2006 | Choi | F16K 31/0655 |
| 7,040,595 | B2 | 5/2006 | Hirota | F16K 31/02 |
| 7,481,417 | B2 | 1/2009 | Mayer | F16K 51/02 |
| 7,533,687 | B2 | 5/2009 | Uemura | F16K 27/048 |
| 7,726,949 | B2 | 6/2010 | Taguchi | F04B 1/26 |
| 7,758,014 | B2 | 7/2010 | Lancaster | F16K 1/04 |
| 7,832,653 | B2 | 11/2010 | Yukimoto | F25B 41/39 |
| 7,958,908 | B2 | 6/2011 | Cho et al. | F15B 13/044 |
| 7,971,797 | B2 | 7/2011 | Habermann | F16K 31/002 |
| 8,021,124 | B2 | 9/2011 | Umemura | F04B 27/1804 |
| 8,079,827 | B2 | 12/2011 | Iwa | F04B 27/1804 |
| 8,128,061 | B2 | 3/2012 | Uemura | F04B 27/1804 |
| 8,225,818 | B1 | 7/2012 | Stephens | F15B 13/0442 |
| 8,328,163 | B2 | 12/2012 | Boesch | F16K 1/36 |
| 8,387,947 | B2 | 3/2013 | Uemura | F04B 27/1804 |
| 8,469,337 | B1 | 6/2013 | Hoeptner | F16K 1/36 |
| 8,579,257 | B2 | 11/2013 | Taylor | F16K 1/46 |
| 8,651,826 | B2 | 2/2014 | Futakuchi | F04B 27/1804 |
| 8,684,037 | B2 | 4/2014 | Huynh | F15B 13/01 |
| 9,022,346 | B2 | 5/2015 | Najmolhoda | F16K 31/0613 |
| 9,027,598 | B2 | 5/2015 | Schneider | F16K 31/0613 |
| 9,132,714 | B2 | 9/2015 | Futakuchi | F04B 27/1804 |
| 9,243,733 | B2 | 1/2016 | Lively | G05D 16/02 |
| 9,297,373 | B2 | 3/2016 | Bagagli | F16K 15/026 |
| 9,383,021 | B2 | 7/2016 | Kosmehl | F16K 1/36 |
| 9,400,027 | B2 | 7/2016 | Imaizumi | F16F 1/32 |
| 9,453,518 | B2 | 9/2016 | Schulz | F15B 13/043 |
| 9,470,337 | B2 | 10/2016 | Roper | F16K 1/36 |
| 9,581,149 | B2 | 2/2017 | Ota et al. | F04B 27/1804 |
| 9,581,150 | B2 | 2/2017 | Ota et al. | F04B 27/1804 |
| 9,638,082 | B2 | 5/2017 | Fujita | F16K 25/00 |
| 9,732,874 | B2 | 8/2017 | Saeki | F16K 31/0603 |
| 9,874,286 | B2 | 1/2018 | Bagagli | F16K 15/12 |
| 10,113,539 | B2 | 10/2018 | Sugamura | F04B 27/1804 |
| 10,378,657 | B2 | 8/2019 | Lin | F16K 1/46 |
| 10,519,944 | B2 | 12/2019 | Taguchi | F04B 27/1804 |
| 10,557,463 | B2 | 2/2020 | Sugamura | F04B 27/1804 |
| 10,690,125 | B2 | 6/2020 | Hayama | F04B 27/18 |
| 10,784,804 | B2 | 9/2020 | Sasaki | H02P 25/022 |
| 10,837,431 | B2 | 11/2020 | Tonegawa | F04B 49/22 |
| 11,085,431 | B2 | 8/2021 | Fukudome et al. | F16K 31/06 |
| 11,092,244 | B1 | 8/2021 | Hu | F16K 1/36 |
| 11,480,166 | B2 | 10/2022 | Hayama et al. | F04B 27/10 |
| 2001/0003573 | A1 | 6/2001 | Kimura et al. | 417/222.2 |
| 2002/0134444 | A1 | 9/2002 | Isobe | F16K 27/041 |
| 2003/0145615 | A1 | 8/2003 | Sasaki | F16K 31/0637 |
| 2003/0197141 | A1 | 10/2003 | Kajitani | F16L 47/00 |
| 2003/0202885 | A1 | 10/2003 | Taguchi | F04B 49/00 |
| 2004/0045305 | A1 | 3/2004 | Murase | F25B 49/022 |
| 2004/0165994 | A1 | 8/2004 | Umemura | F04B 27/1804 |
| 2005/0076959 | A1 | 4/2005 | Yamamoto | F16K 31/0624 |
| 2005/0151310 | A1 | 7/2005 | Rodeffer | F16F 1/32 |
| 2005/0163624 | A1 | 7/2005 | Taguchi | F04B 27/1804 |
| 2007/0214814 | A1 | 9/2007 | Umemura et al. | |
| 2007/0264134 | A1 | 11/2007 | Hirota | F04B 27/1804 |
| 2008/0138213 | A1 | 6/2008 | Umemura et al. | 417/222.2 |
| 2008/0175727 | A1 | 7/2008 | Umemura et al. | F04B 49/22 |
| 2009/0108221 | A1 | 4/2009 | Umemura et al. | 251/129.15 |
| 2009/0114871 | A1 | 5/2009 | Iwa | F04B 27/14 |
| 2009/0183786 | A1 * | 7/2009 | Iwa | F04B 27/1804 137/488 |
| 2009/0256091 | A1 | 10/2009 | Nordstrom | F16K 31/0613 |
| 2010/0019406 | A1 | 1/2010 | Shoji et al. | F16K 1/34 |
| 2010/0051838 | A1 | 3/2010 | Uemura | F04B 27/1804 |
| 2010/0282991 | A1 * | 11/2010 | Okamoto | F16K 31/0655 251/129.15 |
| 2011/0041941 | A1 | 2/2011 | Sonsterod | F16K 15/14 |
| 2011/0061749 | A1 | 3/2011 | Okamoto | F16K 31/0655 |
| 2011/0089352 | A1 | 4/2011 | Morgan | F16K 11/0716 |
| 2011/0203888 | A1 | 8/2011 | Sonsterod | F16F 9/32 |
| 2012/0056113 | A1 | 3/2012 | Tano | F04B 27/1804 |
| 2012/0097881 | A1 | 4/2012 | Aoyama | F16K 1/425 |
| 2012/0198992 | A1 | 8/2012 | Futakuchi et al. | 91/505 |
| 2012/0198993 | A1 | 8/2012 | Fukudome | 91/505 |
| 2012/0211686 | A1 | 8/2012 | Okamoto | F16K 31/0655 |

(56) References Cited

U.S. PATENT DOCUMENTS

| | | | | |
|---|---|---|---|---|
| 2013/0291963 | A1 | 11/2013 | Futakuchi et al. | 137/487.5 |
| 2014/0099214 | A1 | 4/2014 | Fukudome | 417/222.2 |
| 2014/0109973 | A1 | 4/2014 | Neumeister | C23C 16/4412 |
| 2014/0130916 | A1 | 5/2014 | Saeki | F16K 31/0613 |
| 2014/0294632 | A1* | 10/2014 | Kondo | F04B 27/1045 |
| | | | | 417/434 |
| 2014/0369862 | A1 | 12/2014 | Ota et al. | F04B 27/1804 |
| 2015/0004010 | A1 | 1/2015 | Saeki | F04B 27/1804 |
| 2015/0021131 | A1 | 1/2015 | Wootten | F16F 9/348 |
| 2015/0027573 | A1 | 1/2015 | Ochiai | F15B 13/0402 |
| 2015/0044067 | A1 | 2/2015 | Ota et al. | F04B 27/1804 |
| 2015/0068628 | A1 | 3/2015 | Iwa | 137/625.65 |
| 2015/0104334 | A1 | 4/2015 | Ota et al. | F04B 27/1804 |
| 2015/0275874 | A1 | 10/2015 | Ota | F04B 27/1804 |
| 2015/0276065 | A1 | 10/2015 | Yoshida | F16K 3/246 |
| 2015/0345655 | A1 | 12/2015 | Higashidozono | 137/624.27 |
| 2016/0053755 | A1 | 2/2016 | Taguchi | F04B 49/22 |
| 2016/0208954 | A1 | 7/2016 | Ito et al. | F16K 39/02 |
| 2016/0290326 | A1 | 10/2016 | Sugamura | F04B 27/1804 |
| 2017/0261113 | A1 | 9/2017 | Sato | F16K 31/0675 |
| 2017/0284562 | A1 | 10/2017 | Hayama | F16K 41/00 |
| 2018/0156345 | A1 | 6/2018 | Kanda | F15B 13/0431 |
| 2018/0187793 | A1 | 7/2018 | Futakuchi | F04B 39/08 |
| 2018/0238455 | A1 | 8/2018 | Yazawa | F16K 31/508 |
| 2018/0291888 | A1 | 10/2018 | Tonegawa et al. | F04B 49/22 |
| 2018/0372129 | A1 | 12/2018 | Kato et al. | F15B 13/04 |
| 2019/0162175 | A1 | 5/2019 | Higashidozono | F04B 27/18 |
| 2019/0293061 | A1* | 9/2019 | Kume | F16K 11/048 |
| 2020/0011444 | A1 | 1/2020 | Morita et al. | F16K 31/04 |
| 2020/0032781 | A1 | 1/2020 | Higashidozono | F16K 31/0624 |
| 2020/0088178 | A1 | 3/2020 | Fukudome et al. | F16K 31/06 |
| 2020/0173580 | A1 | 6/2020 | Sandeck | F16K 51/02 |
| 2020/0309105 | A1 | 10/2020 | Hayama et al. | F04B 27/18 |
| 2020/0318624 | A1 | 10/2020 | Hayama | F04B 27/18 |
| 2020/0325881 | A1* | 10/2020 | Hayama | F04B 49/22 |
| 2020/0332786 | A1 | 10/2020 | Hayama | F04B 27/1804 |
| 2020/0362974 | A1 | 11/2020 | Hayama et al. | F16K 11/24 |
| 2020/0370545 | A1 | 11/2020 | Hayama et al. | F04B 27/18 |
| 2021/0372396 | A1 | 12/2021 | Kurihara | G05D 7/0635 |
| 2021/0404570 | A1 | 12/2021 | Hayama et al. | F16K 17/04 |
| 2022/0213878 | A1 | 7/2022 | Fukudome et al. | F04B 27/18 |

FOREIGN PATENT DOCUMENTS

| | | | | |
|---|---|---|---|---|
| CN | 110260001 | 9/2019 | | F16K 15/016 |
| CN | 110735965 | 1/2020 | | F16K 1/00 |
| CN | 111279076 | 6/2020 | | F04B 27/18 |
| CN | 111316028 | 6/2020 | | F16K 31/06 |
| CN | 111417780 | 7/2020 | | F04B 27/14 |
| DE | 2414893 | 10/1975 | | F16K 15/00 |
| DE | 2706439 | 8/1978 | | F16K 11/04 |
| DE | 102006033747 | 1/2008 | | F16K 31/00 |
| EP | 0229315 | 7/1987 | | F02M 3/07 |
| EP | 1519128 | 3/2005 | | F25B 41/06 |
| EP | 2180217 | 4/2010 | | F16K 31/06 |
| EP | 2594794 | 5/2013 | | F04B 27/18 |
| EP | 3056778 | 8/2016 | | F16K 31/04 |
| EP | 3258103 | 12/2017 | | F04B 27/18 |
| EP | 3296599 | 3/2018 | | F16K 1/34 |
| EP | 3366957 | 8/2018 | | F16K 1/34 |
| EP | 3726054 | 10/2020 | | F04B 27/18 |
| JP | 5682358 | 7/1981 | | G03B 15/00 |
| JP | 5740945 | 8/1982 | | B21B 39/14 |
| JP | H04171361 | 6/1992 | | F04B 49/00 |
| JP | 5346276 | 12/1993 | | F25B 41/96 |
| JP | 626454 | 2/1994 | | F04B 27/08 |
| JP | H0711313 | 2/1995 | | F16K 1/34 |
| JP | H8159320 | 6/1996 | | F16K 31/04 |
| JP | H10220926 | 8/1998 | | F25B 41/06 |
| JP | 11287281 | 10/1999 | | F16F 9/348 |
| JP | 200020763 | 8/2000 | | F16K 31/06 |
| JP | 2000304152 | 11/2000 | | F16D 48/02 |
| JP | 2001012534 | 1/2001 | | F16F 9/46 |
| JP | 2001501290 | 1/2001 | | F16K 31/06 |
| JP | 2001153495 | 6/2001 | | F16K 31/06 |
| JP | 2001153498 | 6/2001 | | F16K 31/06 |
| JP | 2001165055 | 6/2001 | | F04B 27/14 |
| JP | 2001263527 | 9/2001 | | F16K 31/06 |
| JP | 2002216803 | 8/2002 | | H01M 8/02 |
| JP | 2003004160 | 1/2003 | | F16K 31/04 |
| JP | 2003301772 | 10/2003 | | |
| JP | 2003314745 | 11/2003 | | F16K 51/02 |
| JP | 2003322086 | 11/2003 | | F04B 49/00 |
| JP | 2004003468 | 1/2004 | | F04B 27/14 |
| JP | 2004101163 | 4/2004 | | F25B 41/06 |
| JP | 2005307817 | 11/2005 | | F04B 27/14 |
| JP | 2005351605 | 12/2005 | | F16K 1/38 |
| JP | 2006153204 | 6/2006 | | F16K 31/04 |
| JP | 2007247512 | 9/2007 | | F04B 27/14 |
| JP | 2008157031 | 7/2008 | | F04B 27/14 |
| JP | 2008190574 | 8/2008 | | F16K 31/06 |
| JP | 2009030752 | 2/2009 | | F16K 31/06 |
| JP | 2009115204 | 5/2009 | | F16K 31/04 |
| JP | 2009221965 | 10/2009 | | F04B 27/14 |
| JP | 2009275550 | 11/2009 | | F04B 49/00 |
| JP | 2010019406 | 1/2010 | | F16K 31/04 |
| JP | 2011501798 | 1/2011 | | F16K 15/14 |
| JP | 2011525962 | 9/2011 | | F16F 9/32 |
| JP | 4822735 | 11/2011 | | A43B 23/24 |
| JP | 2012144986 | 8/2012 | | F04B 27/14 |
| JP | 2012211579 | 11/2012 | | F04B 27/14 |
| JP | 2013024135 | 2/2013 | | F04B 27/14 |
| JP | 5167121 | 3/2013 | | F04B 27/14 |
| JP | 2013100915 | 5/2013 | | F15K 31/06 |
| JP | 2013194918 | 9/2013 | | F16K 1/36 |
| JP | 2014080927 | 5/2014 | | F04B 27/16 |
| JP | 2014092207 | 5/2014 | | F16K 31/06 |
| JP | 2014095463 | 5/2014 | | F16K 31/06 |
| JP | 2014194180 | 10/2014 | | F04B 27/14 |
| JP | 2015075054 | 4/2015 | | F04B 27/14 |
| JP | 20151168 | 5/2015 | | F04B 27/14 |
| JP | 2015137546 | 7/2015 | | F04B 27/14 |
| JP | 2015178795 | 10/2015 | | F04B 27/14 |
| JP | 5983539 | 8/2016 | | F04B 27/18 |
| JP | 2016196825 | 11/2016 | | F04B 27/18 |
| JP | 2016196876 | 11/2016 | | F04B 27/18 |
| JP | 2016205404 | 12/2016 | | F04B 27/18 |
| JP | 6135521 | 5/2017 | | F04B 27/18 |
| JP | 2017089832 | 5/2017 | | F16K 31/06 |
| JP | 2017180525 | 10/2017 | | F16K 31/04 |
| JP | 2018015739 | 2/2018 | | C02F 1/46 |
| JP | 2018035840 | 5/2018 | | |
| JP | 2018115684 | 7/2018 | | B60G 17/08 |
| JP | 2018135954 | 8/2018 | | F16K 31/06 |
| JP | 2018179087 | 11/2018 | | F16K 31/06 |
| JP | 2019131725 | 8/2019 | | |
| JP | 2019138473 | 8/2019 | | F16K 1/36 |
| JP | 2019167982 | 10/2019 | | F16K 1/38 |
| JP | 2020041606 | 3/2020 | | F16K 1/44 |
| JP | 2020060108 | 4/2020 | | F04B 27/18 |
| KR | 20-0400543 | 10/2005 | | B60S 1/52 |
| KR | 1020080011375 | 2/2008 | | F04B 27/14 |
| KR | 102019001499 | 1/2019 | | F16K 31/06 |
| WO | WO9218795 | 10/1992 | | F16K 1/34 |
| WO | WO2006090760 | 8/2006 | | F04B 27/14 |
| WO | WO2007119380 | 10/2007 | | F04B 27/14 |
| WO | WO2009025298 | 2/2009 | | F16K 31/06 |
| WO | WO2011114841 | 9/2011 | | F04B 27/14 |
| WO | WO2011132438 | 10/2011 | | F16K 31/06 |
| WO | WO2012077439 | 6/2012 | | F04B 27/14 |
| WO | WO2014119594 | 8/2014 | | F04B 27/14 |
| WO | WO2014148367 | 9/2014 | | F16K 31/06 |
| WO | WO2018124156 | 7/2018 | | F16K 31/06 |
| WO | WO2019131482 | 7/2019 | | F04B 27/18 |
| WO | WO2020110925 | 11/2019 | | F04B 27/18 |

(56) References Cited

FOREIGN PATENT DOCUMENTS

| | | | |
|---|---|---|---|
| WO | WO2020013169 | 1/2020 | ............ F04B 27/18 |
| WO | WO2020218284 | 10/2020 | ............ F04B 27/18 |

OTHER PUBLICATIONS

International Search Report and Written Opinion and International Preliminary Report on Patentability issued in PCT/JP2021/027769, dated Sep. 7, 2021, 24 pages.
International Search Report and Written Opinion and International Preliminary Report on Patentability issued in PCT/JP2021/027762, dated Oct. 5, 2021, 20 pages.
International Search Report and Written Opinion and International Preliminary Report on Patentability issued in PCT/JP2021/027766, dated Sep. 7, 2021, 24 pages.
International Search Report and Written Opinion and International Preliminary Report on Patentability issued in PCT/JP2021/027770, dated Oct. 5, 2021, 20 pages.
International Search Report and Written Opinion and International Preliminary Report on Patentability issued in PCT/JP2021/027772, dated Sep. 21, 2021, 24 pages.
International Search Report and Written Opinion and International Preliminary Report on Patentability issued in PCT/JP2021/027767, dated Sep. 7, 2021, 22 pages.
International Search Report and Written Opinion and International Preliminary Report on Patentability issued in PCT/JP2021/030007, dated Nov. 2, 2021, 18 pages.
International Search Report and Written Opinion and International Preliminary Report on Patentability issued in PCT/JP2021/034996, dated Dec. 12, 2021, 18 pages.
International Search Report and Written Opinion and International Preliminary Report on Patentability issued in PCT/JP2021/034990, dated Oct. 19, 2021, 18 pages.
International Search Report and Written Opinion and International Preliminary Report on Patentability issued in PCT/JP2021/034995, dated Dec. 14, 2021, 16 pages.
International Search Report and Written Opinion and International Preliminary Report on Patentability issued in PCT/JP2021/044726, dated Dec. 28, 2021, 17 pages.
International Search Report and Written Opinion and International Preliminary Report on Patentability issued in PCT/JP2022/012340, dated May 31, 2022, 24 pages.
Official Action issued in European related Application Serial No. 21853139.0, dated Mar. 22, 2024, 15 pages.
Official Action issued in European related Application Serial No. 21852577.2, dated Mar. 22, 2024, 9 pages.
Official Action issued in European related Application Serial No. 21853892.4, dated Mar. 22, 2024, 8 pages.
Official Action issued in US related U.S. Appl. No. 18/019,230, dated Apr. 25, 2024, 11 pages.
Official Action issued in US related U.S. Appl. No. 18/019,066, dated Apr. 24, 2024, 6 pages.
Official Action issued in US related U.S. Appl. No. 18/029,065, dated Apr. 23, 2024, 14 pages.
Official Action issued in US related U.S. Appl. No. 18/017,825, dated Apr. 15, 2024, 15 pages.
Official Action issued in US related U.S. Appl. No. 18/017,824, dated Mar. 13, 2024, 19 pages.
Official Action issued in US related U.S. Appl. No. 18/019,060, dated Apr. 26, 2024, 6 pages.
Notice of Allowance issued in US related U.S. Appl. No. 18/022,465, dated Apr. 25, 2024, 7 pages.
U.S. Appl. No. 18/019,057, filed Jan. 31, 2023, Fukudome et al.
U.S. Appl. No. 18/019,230, filed Feb. 1, 2023, Fukudome et al.
U.S. Appl. No. 18/019,060, filed Jan. 31, 2023, Kanzaki et al.
U.S. Appl. No. 18/019,066, filed Jan. 31, 2023, Kanzaki et al.
U.S. Appl. No. 18/017,825, filed Jan. 24, 2023, Hayama et al.
U.S. Appl. No. 18/017,824, filed Jan. 24, 2023, Ejima et al.
U.S. Appl. No. 18/029,063, filed Mar. 28, 2023, Higashidozono et al.
U.S. Appl. No. 18/029,065, filed Mar. 28, 2023, Higashidozono.
Official Action issued in European related Application Serial No. 21854468.2, dated Jul. 24, 2024, 7 pages.
Official Action issued in European related Application Serial No. 91853973.2, dated Jul. 25, 2024, 7 pages.
Official Action issued in European related Application Serial No. 21853972.4, dated Jul. 24, 2024, 8 pages.
Official Action issued in European related Application Serial No. 21872539.8, dated Sep. 3, 2024, 5 pages.
Official Action issued in European related Application Serial No. 21875395.2, dated Sep. 13, 2024, 7 pages.
Search Report issued in European related Application Serial No. 21906416.9, dated Oct. 22, 2024, 8 pages.
Official Action issued in Japanese related Application Serial No. 2022-541458, dated Oct. 15, 2024, 6 pages with English Translation.
Official Action issued in Korean related Application Serial No. 10-2023-7004906, dated Jun. 17, 2024, 10 pages with English Translation.
Official Action issued in Korean related Application Serial No. 10-2023-7004905, dated Jun. 17, 2024, 10 pages with English Translation.
Official Action issued in Korean related Application Serial No. 10-2023-7011145, dated Jun. 18, 2024, 6 pages with English Translation.
Official Action issued in Korean related Application Serial No. 10-2023-7004093, dated Jun. 17, 2024, 11 pages with English Translation.
Official Action issued in Korean related Application Serial No. 10-2023-7020969, dated Jun. 21, 2024, 8 pages with English Translation.
Official Action issued in related U.S. Appl. No. 18/029,065, dated Aug. 6, 2024, 10 pages.
Official Action issued in related U.S. Appl. No. 18/019,066, dated Sep. 5, 2024, 7 pages.
Official Action issued in related U.S. Appl. No. 18/019,060, dated Sep. 5, 2024, 7 pages.
Official Action issued in related U.S. Appl. No. 18/267,072, dated Sep. 6, 2024, 9 pages.
Official Action issued in related U.S. Appl. No. 18/019,057, dated Sep. 27, 2024, 11 pages.
Official Action issued in related U.S. Appl. No. 18/267,072, dated Oct. 9, 2024, 15 pages.
Official Action issued in related U.S. Appl. No. 18/019,230, dated Oct. 15, 2024, 13 pages.
Notice of Allowance issued in US related U.S. Appl. No. 18/017,825, dated Aug. 8, 2024, 6 pages.
Notice of Allowance issued in US related U.S. Appl. No. 18/017,824, dated Aug. 27, 2024, 8 pages.

\* cited by examiner

Fig. 4

VALVE

TECHNICAL FIELD

The present invention relates to a valve that controls a working fluid.

BACKGROUND ART

A valve used to control a working fluid in various industrial fields includes a valve seat and a valve body that can come into contact with and separate from the valve seat, and can control the pressure or flow rate of the working fluid by adjusting a valve opening degree.

Examples of representative valve forms of such a valve include a spool valve in which a spool that a valve body moves parallel to an opening that is a valve seat, a butterfly valve in which a valve body includes a rotating shaft, and a lift valve in which a valve body moves orthogonally to an opening that is a valve seat. Among these valves, the lift valve is the most suitable for controlling the flow rate or pressure.

Examples of the lift valve include a capacity control valve of a variable displacement compressor used for an air conditioning system of an automobile or the like. The variable displacement compressor includes a rotating shaft to be rotationally driven by an engine, a swash plate coupled to the rotating shaft such that a tilt angle is variable, compressing pistons coupled to the swash plate, and the like, and by changing the tilt angle of the swash plate, changes a stroke amount of the pistons to control a discharge amount of fluid. This tilt angle of the swash plate can be continuously changed by appropriately controlling pressure in a control chamber while using a suction pressure Ps of a suction chamber that suctions the fluid, a discharge pressure Pd of a discharge chamber that discharges the fluid pressurized by the pistons, and a control pressure Pc of the control chamber that houses the swash plate, by means of the capacity control valve to be driven to open and close by electromagnetic force.

A capacity control valve of Patent Citation 1 includes a valve housing, a valve seat, and a valve body. In the valve housing, a primary pressure space through which a control fluid of the control pressure Pc passes and a secondary pressure space through which the control fluid of the suction pressure Ps passes are formed. The valve seat is provided between the primary pressure space and the secondary pressure space. The valve body is configured such that a valve contact portion is provided in the primary pressure space and a rod portion is provided in a back space on a solenoid side, and can come into contact with and separate from the valve seat. The capacity control valve of Patent Citation 1 adjusts the control pressure Pc of the control chamber by moving the valve body using electromagnetic force generated in a solenoid.

In addition, a communication passage that provides communication between the secondary pressure space and the back space is formed in the valve housing. According to this configuration, the secondary pressure space and the back space are allowed to have the same pressure by the communication passage, and no pressure difference occurs between both sides of the valve body in an axial direction. For this reason, precise control of a rod can be performed according to an electric current applied to the solenoid.

CITATION LIST

Patent Literature

Patent Citation 1: WO 2020/110925 A (PAGE 10 and FIG. 3)

SUMMARY OF INVENTION

Technical Problem

In the capacity control valve of Patent Citation 1, the rod portion of the valve body is inserted into a guide hole provided between the primary pressure space and the back space in the valve housing, and the rod portion is guided by the guide hole to stably slide. However, since a very small gap is formed between an outer peripheral surface of the rod portion and an inner peripheral surface of the guide hole, the control pressure Pc of the primary pressure space slightly leaks to the back space from the gap between the outer peripheral surface of the rod portion and the guide hole, and the control pressure Pc of the primary pressure space cannot be controlled with high accuracy, which is a problem.

The present invention is conceived in view of such a problem, and an object of the present invention is to provide a valve capable of controlling a fluid with high accuracy.

Solution to Problem

In order to solve the foregoing problem, a valve according to the present invention includes: a valve housing having a primary pressure space and a secondary pressure space; a valve seat disposed between the primary pressure space and the secondary pressure space; a valve body that is driven in an axial direction by a driving source to be seated on or separate from the valve seat; and a communication passage that provides communication between a back space adjacent to one of the primary pressure space and the secondary pressure space and remaining one of the primary pressure space and the secondary pressure space, wherein a partition member that is expandable and contractible in the axial direction is disposed between the valve housing and the valve body, and the back space and the one of the primary pressure space and the secondary pressure space are partitioned off from each other in a sealed state by the partition member. According to the aforesaid feature of the present invention, the back space and the one of the primary pressure space and the secondary pressure space are partitioned off from each other in a sealed state by the partition member, and a working fluid does not leak from the one of the primary pressure space and the secondary pressure space to the back space or from the back space to the one of the primary pressure space and the secondary pressure space through a gap between the valve housing and the valve body. For this reason, control of the working fluid of the primary pressure space or the secondary pressure space can be performed with high accuracy. In addition, since the partition member is expandable and contractible in the axial direction, the driving of the valve body is not interfered with.

It may be preferable that a first biasing member that biases the valve body in a valve closing direction and a second biasing member that biases the valve body in a valve opening direction are disposed to face each other. According to this preferable configuration, in addition to the fact that the partition member provides sealing between the back space and the one of the primary pressure space and the secondary pressure space, since the valve body is supported in a state where the valve body is interposed in the axial direction between the first biasing member and the second biasing member, the axial shaking of the valve body is suppressed, so that the valve body and the valve housing can be prevented from sliding on each other, and a frictional force can be prevented from affecting the driving of the valve body. Further, contaminants can be prevented from being stuck in the gap between the valve housing and the valve body.

It may be preferable that the first biasing member is a coil spring, and the valve body is provided with a fitting portion fitted to the coil spring in the axial direction. According to this preferable configuration, the axial shaking of the valve body is suppressed by fitting between the coil spring and the fitting portion.

It may be preferable that the partition member includes a ring portion fixed to the valve housing, and a body portion having an accordion shape of which one end is fixed to the ring portion in a sealed state. According to this preferable configuration, since the body portion having an accordion shape expands and contracts in the axial direction, the axial shaking of the valve body is suppressed.

It may be preferable that an outer peripheral surface of the ring portion is fixed to an inner peripheral surface of the valve housing. According to this preferable configuration, the ring portion can be simply attached to the valve housing. Further, the ring portion does not move in a radial direction, and the axial shaking of the body portion can be reliably suppressed.

It may be preferable that an inner peripheral surface of the ring portion serves as a tilt restriction portion of the valve body. According to this preferable configuration, the inner peripheral surface of the ring portion disposed close to the outer peripheral surface of the valve body can function as the tilt restriction portion to restrict the tilt of the valve body. For this reason, the axial shaking of the valve body can be prevented, and a stable operation can be performed.

It may be preferable that the body portion extends from the ring portion to the one of the primary pressure space and the secondary pressure space. According to this preferable configuration, the back space can be made compact.

It may be preferable that the valve body includes a valve element to be seated on the valve seat and a rod element to be driven by the driving source as separate bodies. According to this preferable configuration, since the valve element and the rod element are separate bodies, it is easy to assemble the valve.

It may be preferable that the partition member includes a fixation plate portion fixed to an end surface of the rod element, and a body portion having an accordion shape of which one end is fixed to the fixation plate portion in a sealed state, and one of the valve body and the fixation plate portion includes a guide recessed portion that guides remaining one of the valve body and the fixation plate portion in a direction toward an axial center. According to this preferable configuration, since the valve body and the partition member are guided relative to each other in the direction toward the axial center by the guide recessed portion, axial alignment between the valve body and the partition member can be performed.

DESCRIPTION OF EMBODIMENTS

Modes for implementing a valve according to the present invention will be described below based on embodiments. Incidentally, in the embodiments, a capacity control valve will be described as an example but the present invention is also applicable to other uses.

First Embodiment

Figure 1:
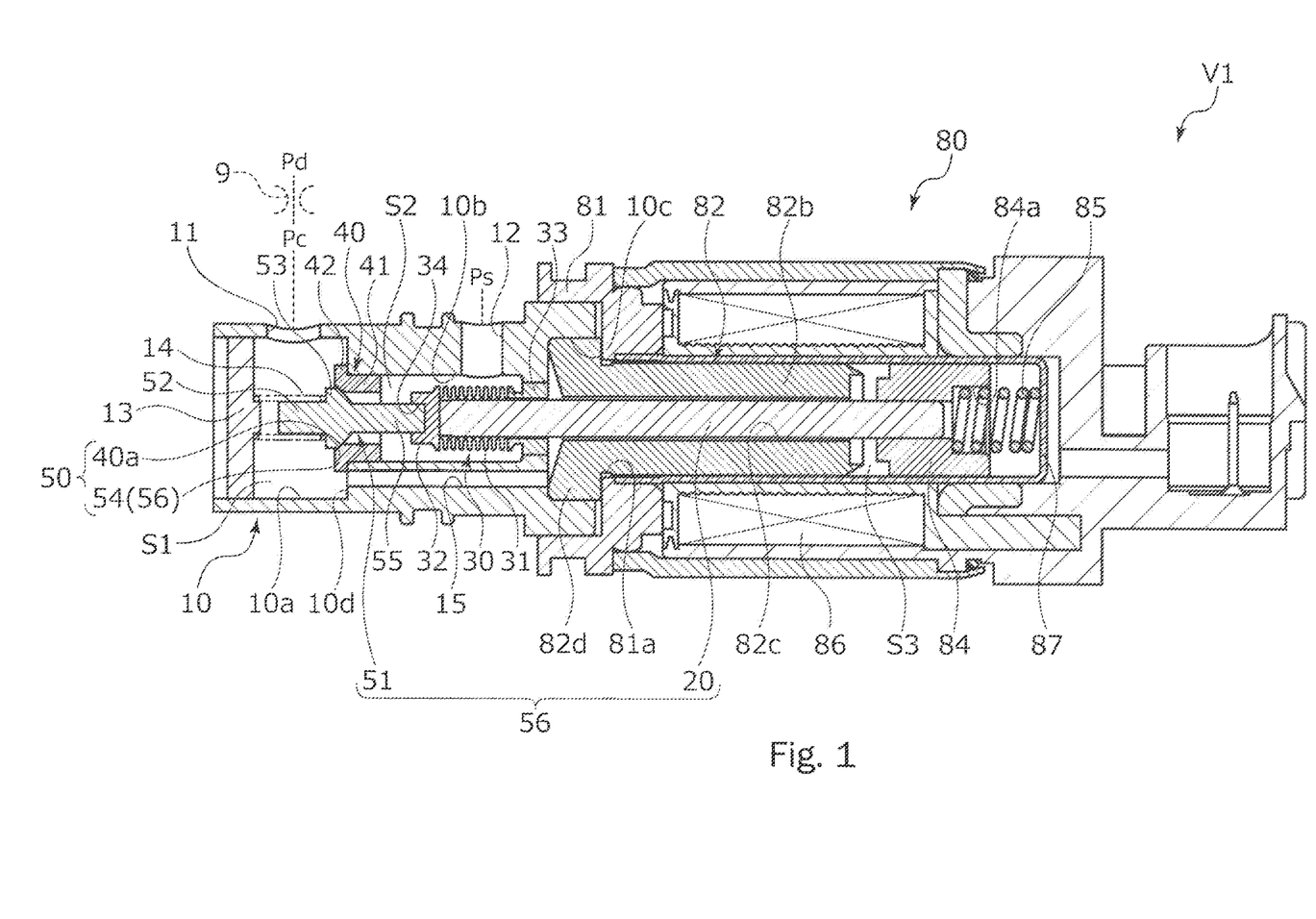
FIG. 1 a cross-sectional view illustrating a capacity control valve as a valve according to a first embodiment of the present invention.

A capacity control valve as a valve according to a first embodiment of the present invention will be described with reference to FIGS. 1 to 3. Hereinafter, a description will be given based on the assumption that the left and right sides when seen from the front side of FIG. 1 are left and right sides of the capacity control valve. In detail, a description will be given based on the assumption that the left side of the drawing sheet on which a valve housing 10 is disposed on the left side of the capacity control valve and the right side of the drawing sheet on which a solenoid 80 is disposed on the right side of the capacity control valve.

The capacity control valve according to the present invention is assembled into a variable displacement compressor (not illustrated) used for an air conditioning system of an automobile or the like, and by variably controlling the pressure of a working fluid (hereinafter, simply referred to as a "fluid") that is a refrigerant, controls the discharge amount of the variable displacement compressor to adjust the cooling capacity of the air conditioning system to a target level.

First, the variable displacement compressor will be described. The variable displacement compressor includes a casing including a discharge chamber, a suction chamber, a control chamber, and a plurality of cylinders. Incidentally, the variable displacement compressor is provided with a communication passage that provides direct communication between the discharge chamber and the control chamber. The communication passage is provided with a fixed orifice 9 that balances pressure between the discharge chamber and the control chamber (refer to FIG. 1).

In addition, the variable displacement compressor includes a rotating shaft, a swash plate, and a plurality of pistons. The rotating shaft is rotationally driven by an engine (not illustrated) installed outside the casing. The swash plate is coupled to the rotating shaft so as to be tiltable by a hinge mechanism in the control chamber. The plurality of pistons are coupled to the swash plate and are reciprocatably fitted in the respective cylinders. The variable displacement compressor continuously changes the tilt angle of the swash plate by appropriately controlling pressure in the control chamber while using a suction pressure Ps of the suction chamber that suctions the fluid, a discharge pressure Pd of the discharge chamber that discharges the fluid pressurized by the pistons, and a control pressure Pc of the control chamber that houses the swash plate, by means of a capacity control valve V1 to be driven to open and close by electromagnetic force. Accordingly, the stroke amount of the pistons is changed to control the discharge amount of the fluid.

As illustrated in FIG. 1, the capacity control valve V1 of the first embodiment assembled into the variable displacement compressor adjusts an electric current that energizes a coil 86 forming the solenoid 80 as a driving source, to perform opening and closing control of a CS valve 50 in the capacity control valve V1. Accordingly, the fluid flowing out from the control chamber to the suction chamber is controlled to variably control the control pressure Pc in the control chamber. Incidentally, a discharge fluid of the discharge pressure Pd of the discharge chamber is constantly supplied to the control chamber via the fixed orifice 9, and the CS valve 50 in the capacity control valve V1 is closed, so that the control pressure Pc in the control chamber is increased.

In the capacity control valve V1 of the first embodiment, the CS valve 50 includes a valve body 56 and a CS valve seat as a valve seat. The CS valve seat 40a is formed in a valve seat member 40 having a tubular shape that is press-fitted and fixed to a communication hole portion 10b of the valve housing 10. A contact portion 54 having a tapered shape that is formed on an axially right side of the CS valve body 51 of the valve body 56 comes into contact with and separates from the CS valve seat 40a in an axial direction to open and close the CS valve 50. Incidentally, the valve body 56 of the first embodiment includes the CS valve body 51 as a valve element and a rod 20 as a rod element.

Next, a structure of the capacity control valve V1 will be described. As illustrated in FIG. 1, the capacity control valve V1 mainly includes the valve housing 10, the valve seat member 40, the CS valve body 51, the rod 20, the solenoid 80, and a bellows 30 as a partition member. The valve housing 10 and the valve seat member 40 are made of a metallic material. The CS valve body 51 is disposed inside the valve housing 10 so as to be reciprocatable in the axial direction. The rod 20 is disposed on an axially right side of the CS valve body 51. The solenoid 80 is connected to the valve housing 10 to exert a driving force on the rod 20 and on the CS valve body 51. The bellows 30 is disposed between the valve housing 10 and the rod 20 in a sealed state.

Figure 2:
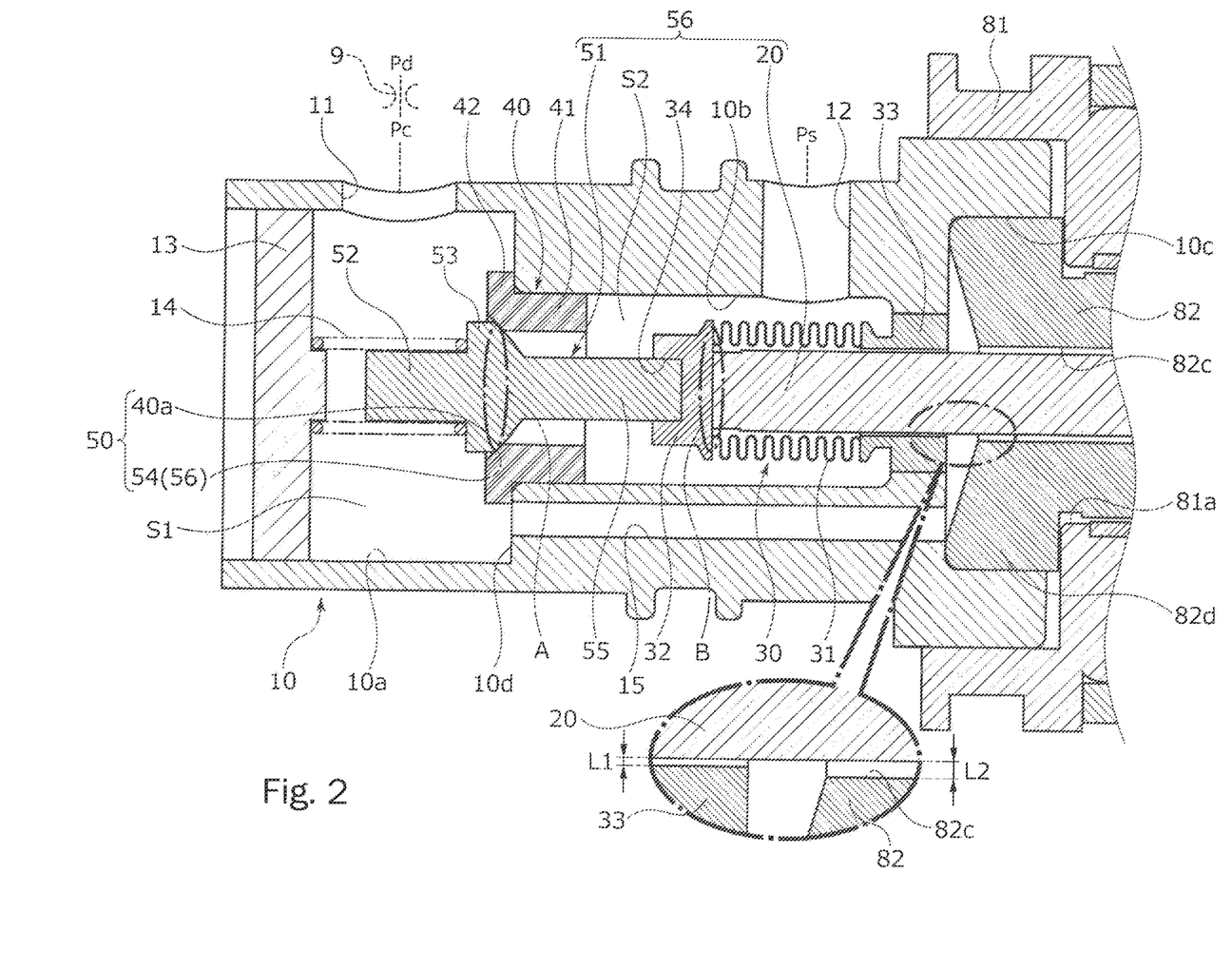
FIG. 2 is an enlarged cross-sectional view of main parts illustrating a state where the capacity control valve is closed in the first embodiment.
Figure 3:
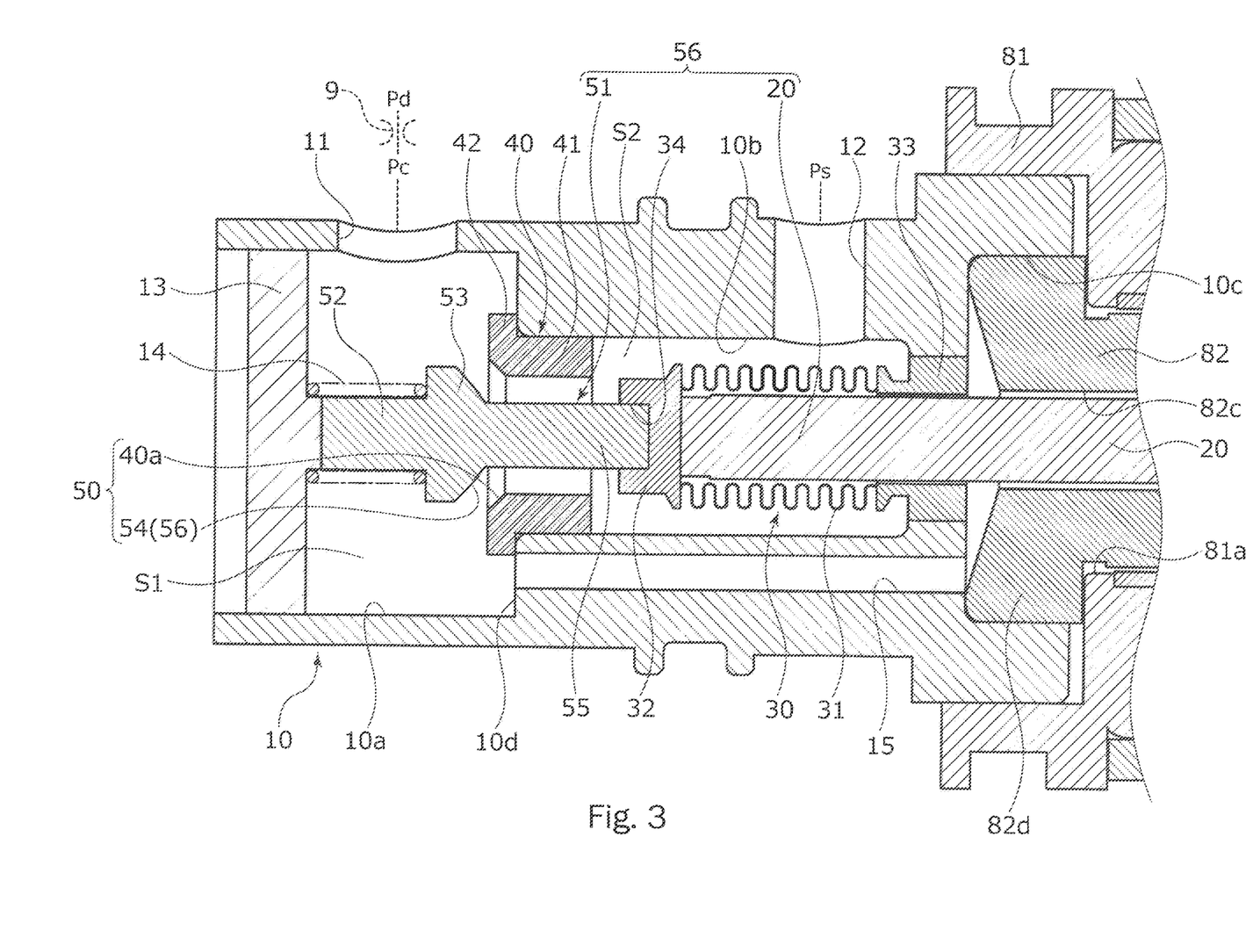
FIG. 3 is an enlarged cross-sectional view of main parts illustrating a state where the capacity control valve is opened in the first embodiment.

As illustrated in FIGS. 1 and 2, a tip shaft portion 52, a large-diameter portion 53, the contact portion 54, and a rear end shaft portion 55 are formed in the CS valve body 51 in order from an axially left end of the CS valve body 51.

The tip shaft portion 52 has substantially the same diameter as that of the rear end shaft portion 55, and the large-diameter portion 53 has a larger diameter than those of the tip shaft portion 52 and the rear end shaft portion 55.

In addition, the contact portion 54 is formed between the large-diameter portion 53 and the rear end shaft portion 55 and has a tapered shape in which the diameter is reduced from an axially left side toward an axially right side.

A primary pressure space S1 communicating with the control chamber through an inlet port 11 penetrating through the valve housing 10 in a radial direction is formed on an axially left side of the valve housing 10. In addition, a secondary pressure space S2 communicating with the discharge chamber through an outlet port 12 penetrating through the valve housing 10 in the radial direction is formed on an axially right side of the primary pressure space S1 in the valve housing 10.

A recessed portion 10a which is recessed from an axially left end of the valve housing 10 to the right in the axial direction and of which an axially left end is open is formed in the valve housing 10.

In addition, the axially left end of the valve housing 10 is closed by a lid member 13, and a space surrounded by the recessed portion 10a and the lid member 13 is the primary pressure space S1.

In addition, a coil spring 14 as first biasing means (also referred to as a first biasing member) that biases the CS valve body 51 to the right in the axial direction, namely, in a valve closing direction of the CS valve 50 is disposed between the lid member 13 and the CS valve body 51.

The coil spring 14 is a push spring, and the tip shaft portion 52 of the CS valve body 51 is inserted into the coil spring 14. Namely, the tip shaft portion 52 of the CS valve body 51 functions as a fitting portion that is fitted to the coil spring 14.

In addition, a recessed portion 10c in which a radially inner side of an axially right end is recessed to the left in the axial direction is formed in the valve housing 10. In addition, the communication hole portion 10b that provides communication in the axial direction is formed between the recessed portion 10a and the recessed portion 10c. The communication hole portion 10b has a smaller diameter than those of the recessed portions 10a and 10c.

In addition, the bellows 30 is fixed to an axially right end of the communication hole portion 10b in a sealed state. A space surrounded by the communication hole portion 10b and the bellows 30 is the secondary pressure space S2.

The bellows 30 includes a body portion 31 having a tubular shape, a fixation plate portion 32, and a ring portion 33 and has a substantially U shape in a radial cross-sectional view. The body portion 31 has accordion pleats that are expandable and contractible in the axial direction. The fixation plate portion 32 closes an opening at an axially left end of the body portion 31. The ring portion 33 is provided at an axially right end of the body portion 31 and press-fitted and fixed to a small-diameter hole portion at the axially right end of the communication hole portion 10b.

The body portion 31, the fixation plate portion 32, and the ring portion 33 are made of metal. The fixation plate portion 32 and the ring portion 33 are formed thicker than the body portion 31 and are more rigid than the body portion 31. Incidentally, the body portion 31, the fixation plate portion 32, and the ring portion 33 may be made of different materials, and it is preferable that the fixation plate portion 32 and the ring portion 33 are more rigid than the body portion 31. In addition, the body portion 31, the fixation plate portion 32, and the ring portion 33 may be made of a material other than metal.

A guide recessed portion 34 recessed to the right in the axial direction is formed at a central portion of a left surface of the fixation plate portion 32. The rear end shaft portion 55 of the CS valve body 51 is fitted to the guide recessed portion 34.

The valve seat member 40 includes a tubular portion 41 and an annular protrusion 42. The tubular portion 41 is press-fitted into the communication hole portion 10b. The annular protrusion 42 protrudes from an axially left end of the tubular portion 41 in a radially outward direction.

Incidentally, an inner diameter of the tubular portion 41 is set to a larger diameter than that of the rear end shaft portion 55 of the CS valve body 51.

The valve seat member 40 is fixed to the valve housing 10 in a sealed state by being press-fitted to an axially left end of the communication hole portion 10b from the left in the axial direction, the communication hole portion 10b penetrating through a bottom of the recessed portion 10a. In addition, the annular protrusion 42 comes into contact with a bottom end surface 10d of the recessed portion 10a, so that the valve seat member 40 is prevented from being over-inserted into the communication hole portion 10b, and the valve seat member 40 is positioned in the axial direction.

In addition, the CS valve seat 40a is formed on a radially inner side of an axially left end of the valve seat member 40, and the CS valve seat 40a has a tapered shape in which the diameter is gradually reduced toward the axially right side.

A flange portion 82d of a center post 82 is internally fitted and fixed to the recessed portion 10c of the valve housing 10 from the right in the axial direction in a sealed state, and a casing 81 is externally fitted and fixed to the valve housing 10 from the right in the axial direction, so that the valve housing 10, the center post 82, and the casing 81 are integrally connected to each other.

A through-hole 15 as communication means (also referred to as a communication passage) is formed in the valve housing 10. The through-hole 15 is open on each of bottom surfaces of the recessed portions 10a and 10c at both ends in the axial direction and extends in the axial direction. The through-hole is formed with a constant cross section and communicates with the primary pressure space S1 and with a back space S3 inside the solenoid 80.

As illustrated in FIG. 1, the solenoid 80 mainly includes the casing 81, the center post 82 having a substantially cylindrical shape, the rod 20, a movable iron core 84, a coil spring 85 as second biasing means (also referred to as a second biasing member), the coil 86 for excitation, and a sleeve 87 having a bottomed tubular shape. The casing 81 includes an opening portion 81a that is open to the left in the axial direction. The center post 82 is inserted into the opening portion 81a of the casing 81 from the left in the axial direction to be disposed between a radially inner side of the casing 81 and a radially inner side of the valve housing 10. The rod 20 is inserted into the center post 82 to be reciprocatable in the axial direction, and an axially left end portion of the rod 20 is disposed inside the valve housing 10. An axially right end portion of the rod 20 is inserted and fixed to the movable iron core 84. The coil spring 85 biases the movable iron core 84 to the left in the axial direction, namely, in a valve opening direction of the CS valve 50. The coil 86 is wound on an outer side of the center post 82 with a bobbin interposed therebetween. The sleeve 87 houses a part of the center post 82, the movable iron core 84, the coil spring 85, and a part of the rod 20.

The center post 82 includes a cylindrical portion 82b and the flange portion 82d having an annular shape. The cylindrical portion 82b is made of a rigid body that is a magnetic material such as iron or silicon steel, and an insertion hole 82c which extends in the axial direction and into which the rod 20 is inserted is formed in the cylindrical portion 82b. The flange portion 82d extends from an outer peripheral surface of an axially left end portion of the cylindrical portion 82b in the radially outward direction.

The coil spring 85 is a push spring and is disposed between the movable iron core 84 and the sleeve 87. In addition, an axially left end of the coil spring 85 is fitted into a recessed portion 84a formed at an axially right end of the movable iron core 84. Incidentally, a biasing force of the coil spring 85 is smaller than that of the coil spring 14.

The back space S3 inside the solenoid 80 is a space that is partitioned off from the secondary pressure space S2 and that is mainly located inside the sleeve 87 on a back side of the CS valve body 51. In detail, the back space S3 includes a space inside the bellows 30, a space between the recessed portion 10c and a left end of the center post 82, a space inside the center post 82, and a space on the left and right of the movable iron core 84 inside the sleeve 87.

The rod 20 is inserted into the insertion hole 82c of the center post 82. The axially right end portion of the rod 20 is inserted and fixed to the movable iron core 84, and the axially left end portion of the rod 20 is inserted into the body portion 31 of the bellows 30. In addition, an axially left end surface of the rod 20 is in contact with a right surface of the fixation plate portion 32. Incidentally, the axially left end surface of the rod 20 may be fixed to the right surface of the fixation plate portion 32 by an adhesive agent, welding, or the like.

In addition, a gap L1 between an outer peripheral surface of the rod 20 and an inner peripheral surface of the ring portion 33 of the bellows 30 is smaller than a gap L2 between the outer peripheral surface of the rod 20 and an inner peripheral surface of the insertion hole 82c of the center post 82 (L1<L2).

According to this configuration, in a case where the rod is slightly tilted when the rod 20 operates, when the pressure of the working fluid is applied to the rod 20, or the like, the rod 20 comes into contact with the inner peripheral surface of the ring portion 33, and the tilt of the rod 20 is restricted. For this reason, the axial shaking of the rod 20 and of the CS valve body 51 can be prevented, and a stable operation can be performed. Namely, the ring portion 33 functions as a tilt restriction portion of the rod.

Next, an opening and closing operation of the capacity control valve V1 will be described.

First, a non-energized state of the capacity control valve V1 will be described. As illustrated in FIGS. 1 and 2, in a non-energized state of the capacity control valve V1, the CS valve body 51 is pressed to the right in the axial direction, namely, in the valve closing direction by the biasing force of the coil spring 14 that is larger than the biasing force of the coil spring 85. Accordingly, the contact portion 54 of the CS valve body 51 is seated on the CS valve seat 40a, and the CS valve 50 is closed.

In detail, the contact portion 54 of the CS valve body 51 comes into contact with and is seated on the CS valve seat 40a formed in a tapered shape to expand toward the axially left side, similarly, the contact portion 54 being formed in a tapered shape to expand toward the axially left side.

At this time, when an effective pressure-receiving area of the CS valve body 51 is A, an effective pressure-receiving area of the bellows 30 is B, and the right in the axial direction is a positive side, the biasing force ($F_{sp1}$) of the coil spring 14, a force ($F_{P1}$)=(P1×(A−B)) due to a pressure P1 of the working fluid in the primary pressure space S1, a force ($F_{P2}$)=−(P2×(A−B)) due to a pressure P2 of the working fluid in the secondary pressure space S2, the biasing force ($-F_{sp2}$) of the coil spring 85, and a biasing force ($-F_{BW}$) of the bellows 30 act on the CS valve body 51 (namely, when the right is the positive side, a force $F_{rod}=F_{sp1}-F_{sp2}+F_{P1}-F_{P2}-F_{BW}$ acts on the CS valve body 51).

At this time, the working fluid in the primary pressure space S1 acts on an axially left end surface of the CS valve body 51. Incidentally, since the primary pressure space S1 and the back space S3 communicate with each other through the through-hole 15 provided in the valve housing 10, the working fluid in the primary pressure space S1 flows into the back space S3.

As described above, the working fluid flowing into the primary pressure space S1 and into the back space S3 is the working fluid of the same primary pressure P1 supplied from the inlet port 11. In addition, since the effective pressure-receiving area A of the CS valve body 51 and the effective pressure-receiving area B of the bellows 30 are equal (A=B), both the forces ($F_{P1}$) and ($F_{P2}$) that act on the CS valve body 51 due to the pressures P1 and P2 of the working fluid are substantially zero.

Namely, when the right is the positive side, since substantially the force $F_{rod}=F_{sp1}-F_{sp2}-F_{BW}$ acts on the CS valve body 51, and the biasing force ($F_{sp1}$) of the coil spring 14 is larger than a sum of the biasing force ($F_{sp2}$) of the coil spring 85 and the biasing force ($-F_{BW}$) of the bellows 30 ($F_{sp1}>F_{sp2}+F_{BW}$), the CS valve body 51 is pressed in the valve closing direction, and the CS valve 50 is closed.

Next, an energized state of the capacity control valve V1 will be described. As illustrated in FIG. 3, in an energized state of the capacity control valve V1 (namely, during normal control or during so-called duty control), when an electromagnetic force ($F_{sol}$) generated by the application of an electric current to the solenoid 80 is larger than the force $F_{rod}$ ($F_{sol}>F_{rod}$), the movable iron core 84 is pulled to a center post 82 side, namely, the axially left side, and the rod 20 fixed to the movable iron core 84 and the CS valve body 51 move together to the axially left side, namely, in the valve opening direction. Accordingly, the contact portion 54 of the CS valve body 51 separates from the CS valve seat 40a, and the CS valve 50 is opened.

In addition, when the solenoid 80 is driven, the tip shaft portion 52 of the CS valve body 51 comes into contact with the lid member 13, so that further separation of the CS valve body 51 from the CS valve seat 40a is restricted.

At this time, the electromagnetic force ($F_{sol}$) and the force $F_{rod}$ act on the CS valve body 51 to the left in the axial direction and to the right in the axial direction, respectively (namely, when the right is the positive side, a force $F_{rod}-F_{sol}$ acts on the CS valve body 51).

As described above, in the capacity control valve V1, the pressure P1 of the working fluid in the primary pressure space S1 can be appropriately controlled by a valve opening degree of the CS valve 50 that is adjusted by a balance between the electromagnetic force ($F_{sol}$) of the solenoid 80 and a difference between the biasing force of the coil spring 14, the biasing force of the coil spring 85, and the biasing force ($-F_{BW}$) of the bellows 30 ($F_{sp1}-F_{sp2}-F_{BW}$).

As described above, the communication hole portion 10b into which the rod 20 is inserted is provided between the secondary pressure space S2 and the back space S3 in the valve housing 10, and the bellows 30 that is expandable and contractible in the axial direction is attached between an inner peripheral surface of the communication hole portion 10b and the outer peripheral surface of the rod 20. According to this configuration, since the secondary pressure space S2 and the back space S3 are partitioned off from each other in a sealed state by the bellows 30, when the CS valve 50 is closed, the working fluid of the back space S3 does not leak to the secondary pressure space S2 through a gap between the communication hole portion 10b and the rod 20. For this reason, control of the working fluid in the primary pressure space S1 can be performed with high accuracy.

In addition, since the body portion 31 of the bellows 30 is expandable and contractible in the axial direction of the rod 20, the axial shaking of the CS valve body 51 and of the rod 20 (namely, the valve body 56) is suppressed, and the driving of the CS valve body 51 and of the rod 20 is not interfered with. In addition, since the bellows 30 has an accordion shape, the bellows 30 can be stably expanded and contracted according to the operation of the rod 20.

In addition, in addition to the fact that the secondary pressure space S2 and the back space S3 are partitioned off from each other in a sealed state by the bellows 30, since the valve body 56 is supported in a state where the valve body 56 faces the coil spring 14 that performs biasing in the valve closing direction and the coil spring 85 that performs biasing in the valve opening direction in the axial direction with the valve body 56 interposed therebetween, the axial shaking of the valve body 56 can be suppressed, and the rod 20 and the valve housing 10 can be prevented from sliding on each other. Accordingly, a gap between the valve housing 10 and the rod 20 can be increased. In other words, since a very small gap is not formed between the valve housing 10 and the rod 20, a frictional force can be prevented from affecting the driving of the rod 20. Further, contaminations can be prevented from being stuck in the very small gap between the valve housing 10 and the rod 20.

In addition, since the tip shaft portion 52 of the CS valve body 51 is fitted into the coil spring 14, the axial shaking of the valve body 56 is suppressed.

In addition, the bellows 30 includes the fixation plate portion 32 fixed to the left end surface of the rod 20, the ring portion 33 fixed to the valve housing 10, and the body portion 31 having an accordion shape that connects the fixation plate portion 32 and the ring portion 33. According to this configuration, since the rod 20 does not penetrate through the fixation plate portion 32, the working fluid can be prevented from leaking from the gap between the rod 20 and the bellows 30. In addition, since the body portion 31 having an accordion shape expands and contracts in the axial direction, the fixation plate portion 32 and the ring portion 33 can be formed thick to increase strength.

In addition, the outer peripheral surface of the ring portion 33 is fixed to an inner peripheral surface of the valve housing 10. Specifically, since the structure is such that the ring portion 33 is press-fitted and fixed to the inner peripheral surface of the valve housing 10, the ring portion 33 can be simply attached to the valve housing 10 without preparing fixing means. Further, the ring portion 33 does not move in the radial direction, and the axial shaking of the body portion 31 can be reliably suppressed.

In addition, the body portion 31 extends from the ring portion 33 toward the secondary pressure space S2. Namely, since the bellows 30 is disposed in the secondary pressure space S2, the back space S3 can be made compact. In other words, since the bellows 30 is not disposed on a back space S3 side, the bellows 30 does not affect the structure of the solenoid 80.

In addition, since the CS valve body 51 and the rod 20 forming the valve body 56 are separate members, and the CS valve body 51 is structured to be fixed to the fixation plate portion 32, it is easy to assemble the CS valve 50. Specifically, the fixation plate portion 32 of the bellows 30 is fixed to the rod 20, and the ring portion 33 of the bellows is press-fitted and fixed to the valve housing 10 to assemble the solenoid 80 and the valve housing 10, and the valve seat member 40 is fixed to the valve housing 10, and the CS valve body 51 is penetrated through the valve seat member and is connected to the fixation plate portion 32 of the bellows 30, so that the CS valve 50 can be assembled. Namely, even when the valve housing 10 is not formed in a half cut shape or the like, the valve seat member 40 or the CS valve body 51 can be inserted from the left in the axial direction and easily assembled.

In addition, the guide recessed portion 34 recessed to the right in the axial direction is formed at the central portion of the left surface of the fixation plate portion 32 of the bellows

30, and the rear end shaft portion 55 of the CS valve body 51 is fitted to the guide recessed portion 34. According to this configuration, the CS valve body 51 and the bellows 30 are guided relative to each other in the axial center direction by the guide recessed portion 34. For this reason, axial alignment between the CS valve body 51 and the bellows 30 can be performed.

Second Embodiment

Next, a capacity control valve as a valve according to a second embodiment of the present invention will be described with reference to FIG. 4. Incidentally, a description of duplicated configurations that are the same as the configurations of the first embodiment will be omitted.

Figure 4:
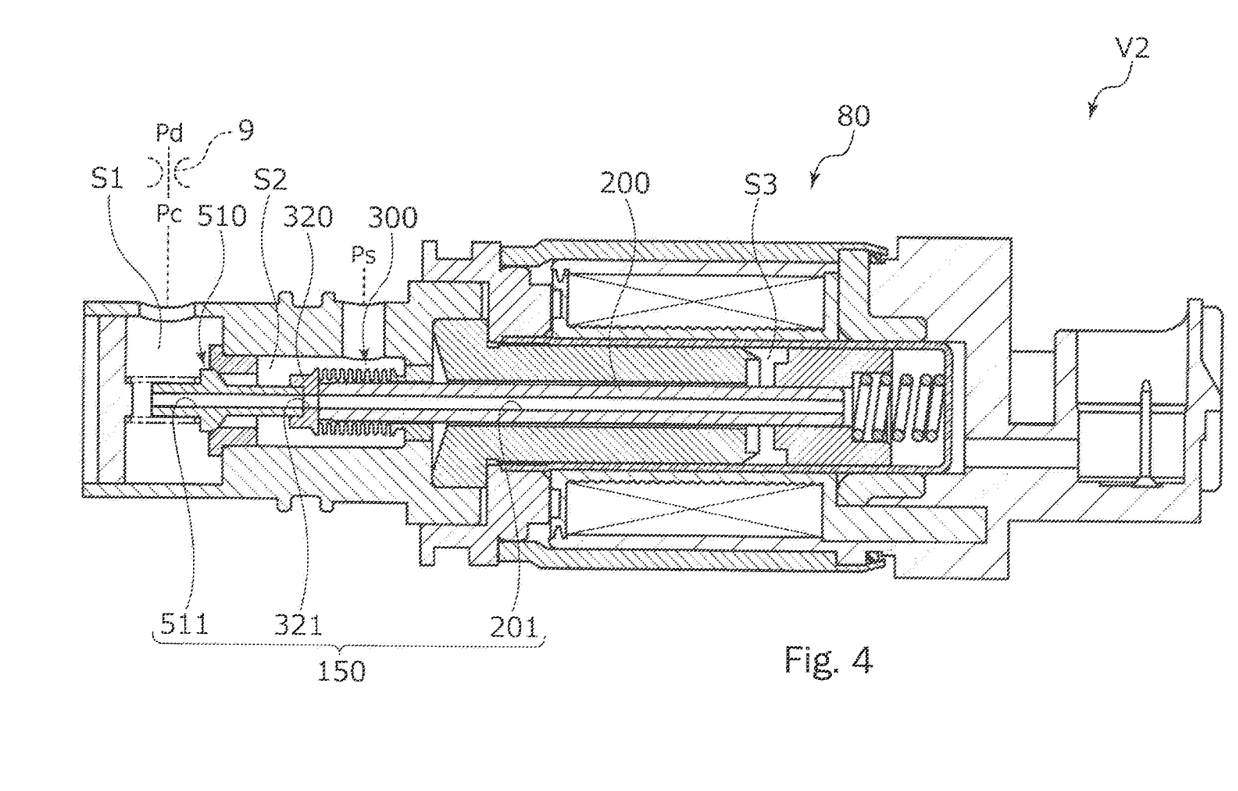
FIG. 4 a cross-sectional view illustrating a capacity control valve as a valve according to a second embodiment of the present invention.

As illustrated in FIG. 4, a through-hole 511 is formed in a CS valve body 510 of a capacity control valve V2 of the second embodiment so as to penetrate therethrough in the axial direction. In addition, a through-hole 321 is formed in a fixation plate portion 320 of a bellows 300 so as to penetrate therethrough in the axial direction. In addition, a through-hole 201 is formed in a rod 200 so as to penetrate therethrough in the axial direction.

The through-hole 511 of the CS valve body 510, the through-hole 321 of the bellows 300, and the through-hole 201 of the rod 200 communicate with each other in the axial direction and form one through-hole 150. The primary pressure space S1 and the back space S3 communicate with each other through the through-hole 150. Namely, the through-hole 150 functions as communication means.

Since the primary pressure space S1 and the back space S3 are allowed to have the same pressure by the through-hole 150, no pressure difference occurs between the primary pressure space S1 and the back space S3. For this reason, the CS valve body 510 and the rod 200 can be accurately operated according to an electric current applied to the solenoid 80.

The embodiments of the present invention have been described above with reference to the drawings; however, the specific configurations are not limited to the embodiments, and the present invention also includes changes or additions that are made without departing from the scope of the present invention.

For example, in the first and second embodiments, a configuration in which the valve element and the rod element are formed as separate member has been provided as an example, but the present invention is not limited to the configuration, and the valve element and the rod element may be integrated. In addition, a mode in which the valve element has a tapered shape has been provided as an example, but the valve element can be freely changed.

In addition, in the first and second embodiments, the end surface of the fixation plate portion is fixed to the end surface of the rod, but the present invention is not limited to the configuration, and the end surface of the rod may not necessarily fixed to the end surface of the fixation plate portion. Even when the end surface of the rod is not fixed to the end surface of the fixation plate portion, a state where the end surface of the rod and the end surface of the fixation plate portion are in contact with each other can be maintained by the first biasing means and the second biasing means.

In addition, in the first and second embodiments, a mode in which the fixation plate portion and the valve element are separate bodies has been provided as an example, but the fixation plate portion and the valve element may be integrated.

In addition, in the first and second embodiments, a mode in which the valve element is fitted and fixed to the guide recessed portion provided in the fixation plate portion has been provided as an example, but the valve element may be provided with the guide recessed portion, and a protrusion protruding from the fixation plate portion may be fitted to the guide recessed portion.

In addition, in the first and second embodiments, a mode in which the primary pressure space, the secondary pressure space, and the back space are formed in order from the left in the axial direction has been provided as an example, but the present invention is not limited to the mode, and the positions of the primary pressure space and the secondary pressure space may be reversed. Specifically, the back space may be formed adjacent to the primary pressure space.

In addition, in the first and second embodiments, a normally closed type valve has been described, but the present invention is not limited thereto and may be applied to a normally open type valve.

In addition, in the first and second embodiments, a mode in which the valve element is disposed in the primary pressure space has been provided as an example, but the valve element may be disposed in the secondary pressure space.

In addition, in the first and second embodiments, a mode in which the first biasing means and the second biasing means are push springs has been provided as an example, but the first biasing means and the second biasing means may be pull springs. In addition, the first biasing means and the second biasing means are not limited to a coil spring, and one of or both the first biasing means and the second biasing means may be leaf springs or the like.

In addition, in the first and second embodiments, a mode in which the first biasing means and the second biasing means are provided has been provided as an example, but only one thereof may be provided and the other may be omitted. For example, in the case of a normally closed type valve, the second biasing means that performs biasing in the valve opening direction may not be provided. In addition, for example, in the case of a normally open type valve, the first biasing means that performs biasing in the valve closing direction may not be provided.

In addition, in the first and second embodiments, a mode in which the first biasing means is disposed in the primary pressure space has been provided as an example, but the location where the first biasing means is disposed may be freely changed. For example, the first biasing means may be disposed in the secondary pressure space or in the back space (between the center post and the movable iron core).

In addition, in the first and second embodiments, a mode in which the second biasing means is disposed in the back space has been provided as an example, but the location where the second biasing means is disposed may be freely changed. For example, the second biasing means may be disposed in the secondary pressure space.

In addition, in the first and second embodiments, a mode in which the bellows has a biasing force has been provided as an example, but the bellows may not have a biasing force.

In addition, in the first and second embodiments, a mode in which the bellows is disposed in the secondary pressure space has been provided as an example, but the bellows may be disposed in the back space.

In addition, in the first and second embodiments, a mode in which the effective pressure-receiving area of the valve element and the effective pressure-receiving area of the bellows are equal has been provided as an example, but the effective pressure-receiving area of the valve element and the effective pressure-receiving area of the bellows may be different from each other.

In addition, in the first and second embodiments, a mode in which the body portion of the partition member has an accordion shape has been provided as an example, but the present invention is not limited to the mode, and the body portion may be expandable and contractible.

In addition, in the first and second embodiments, a mode in which the valve is a capacity control valve has been described, but the valve may be an expansion valve or the like disposed between a condenser and an evaporator in an air conditioning system.

In addition, in the first and second embodiments, a mode in which the valve seat and the valve housing are separate members has been provided as an example, but the valve seat may be integrally formed with the valve housing.

In addition, in the first embodiment, a mode in which the communication means is a through-hole provided in the valve housing has been provided as an example, and in the second embodiment, a mode in which the communication means is a through-hole penetrating through the valve body, through the partition member, and through the back space has been provided as an example, but the present invention is not limited to the modes, and the communication means may be a communication passage through which the back space and the control chamber directly communicate with each other.

REFERENCE SIGNS LIST

10 Valve housing
14 Coil spring (first biasing member)
15 Through-hole (communication passage)
20 Rod (rod element, valve body)
30 Bellows (partitioning member)
31 Body portion
32 Fixation plate portion
33 Ring portion
34 Guide recessed portion
CS valve seat (valve seat)
CS valve (valve)
51 CS valve body (valve element, valve body)
56 Valve body
80 Solenoid (driving source)
85 Coil spring (second biasing member)
150 Through-hole (communication passage)
200 Rod (rod element, valve body)
300 Bellows (partitioning member)
510 CS valve body (valve element, valve body)
A, B Effective pressure-receiving area
S1 Primary pressure space
S2 Secondary pressure space
S3 Back space
V1, V2 Capacity control valve

The invention claimed is:

1. A valve, comprising:
a valve housing having a first space and a second space;
a valve seat disposed between the first space and the second space;
a valve body that is driven in an axial direction by a driving source to be seated on or separate from the valve seat; and
a communication passage that provides communication between the second space and a back space adjacent to the first space,
wherein the first space is formed between the back space and the second space in an axial direction,
a partition that is expandable and contractible in the axial direction is disposed between the valve housing and the valve body, and the back space and the first space are partitioned off from each other in a sealed state by the partition,
wherein the partition includes a ring portion fixed to the valve housing, and a body portion having an accordion shape of which one end is fixed to the ring portion in a sealed state, and
wherein an inner peripheral surface of the ring portion serves as a tilt restriction portion of the valve body.

2. The valve according to claim 1,
wherein a first spring that biases the valve body in a valve closing direction and a second spring that biases the valve body in a valve opening direction are disposed to face each other.

3. The valve according to claim 2,
wherein the first spring is a coil spring, and the valve body is provided with a fitting portion fitted to the coil spring in the axial direction.

4. The valve according to claim 3,
wherein the valve body includes a valve element to be seated on the valve seat and a rod element to be driven by the driving source as separate bodies.

5. The valve according to claim 2,
wherein the valve body includes a valve element to be seated on the valve seat and a rod element to be driven by the driving source as separate bodies.

6. The valve according to claim 5,
wherein the partition further includes a fixation plate portion fixed to an end surface of the rod element,
the body portion has one end fixed to the fixation plate portion in a sealed state, and
one of the valve body and the fixation plate portion includes a guide recessed portion that guides remaining one of the valve body and the fixation plate portion in a direction toward an axial center.

7. The valve according to claim 1,
wherein an outer peripheral surface of the ring portion is fixed to an inner peripheral surface of the valve housing.

8. The valve according to claim 1,
wherein the body portion extends from the ring portion to the first space.

9. The valve according to claim 1,
wherein the valve body includes a valve element to be seated on the valve seat and a rod element to be driven by the driving source as separate bodies.

10. The valve according to claim 9,
wherein the partition further includes a fixation plate portion fixed to an end surface of the rod element, the body portion has one end fixed to the fixation plate portion in a sealed state, and one of the valve body and the fixation plate portion includes a guide recessed portion that guides remaining one of the valve body and the fixation plate portion in a direction toward an axial center.

11. The valve according to claim 1, wherein the partition is in the form of a bellows.

* * * * *